United States Patent
Wu et al.

(10) Patent No.: US 12,063,696 B2
(45) Date of Patent: Aug. 13, 2024

(54) RESOURCE ALLOCATION METHOD, BASE STATION, AND TERMINAL

(71) Applicant: HUAWEI TECHNOLOGIES CO., LTD., Guangdong (CN)

(72) Inventors: Ji Wu, Shanghai (CN); Jiayin Zhang, Shanghai (CN); Jianqin Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 348 days.

(21) Appl. No.: 17/520,985

(22) Filed: Nov. 8, 2021

(65) Prior Publication Data

US 2022/0061089 A1  Feb. 24, 2022

Related U.S. Application Data

(63) Continuation of application No. PCT/CN2020/089233, filed on May 8, 2020.

(30) Foreign Application Priority Data

May 9, 2019 (CN) .......................... 201910385123.4

(51) Int. Cl.
*H04W 74/0833* (2024.01)
*H04W 8/00* (2009.01)
(Continued)

(52) U.S. Cl.
CPC ......... *H04W 74/085* (2013.01); *H04W 8/005* (2013.01); *H04W 56/001* (2013.01);
(Continued)

(58) Field of Classification Search
CPC . H04W 74/085; H04W 8/005; H04W 56/001; H04W 72/0446; H04W 74/006; H04W 74/0866
See application file for complete search history.

(56) References Cited

U.S. PATENT DOCUMENTS

2018/0323856 A1* 11/2018 Xiong ................ H04W 74/004
2019/0281624 A1*  9/2019 Kim .................... H04J 13/0062
(Continued)

FOREIGN PATENT DOCUMENTS

CN  102724757 A  10/2012
CN  105636221 A   6/2016
(Continued)

OTHER PUBLICATIONS

Qualcomm Incorporated, Initial access and mobility procedures for NR unlicensed. 3GPP TSG RAN WG1 Meeting #96bis, Xian, China, Apr. 8-12, 2019, R1-1905000, 15 pages.
(Continued)

*Primary Examiner* — Michael A Keller
(74) *Attorney, Agent, or Firm* — WOMBLE BOND DICKINSON (US) LLP (57) ABSTRACT

Embodiments of this application disclose a resource allocation method, a base station, and a terminal. The method includes: A base station sends a configuration message to a terminal, where the configuration message is used to configure, for the terminal, a random access channel RACH resource used in a channel occupancy time COT. The base station receives a random access request that is sent by the terminal based on the RACH resource allocated by using the configuration message. According to embodiments of this application, a random access latency of the terminal can be reduced.

12 Claims, 3 Drawing Sheets

A terminal receives a configuration message sent by a base station, where the configuration message is used to configure, for the terminal, a random access channel RACH resource used in a channel occupancy time COT — S301

The terminal sends a random access request to the base station based on the RACH resource allocated by the configuration message — S302

(51) Int. Cl.
  *H04W 56/00* (2009.01)
  *H04W 72/0446* (2023.01)
  *H04W 74/00* (2009.01)
  *H04W 74/08* (2009.01)
(52) U.S. Cl.
  CPC ..... *H04W 72/0446* (2013.01); *H04W 74/006* (2013.01); *H04W 74/0866* (2013.01)

(56) References Cited

U.S. PATENT DOCUMENTS

2020/0275483 A1* 8/2020 Li ..................... H04L 5/0078
2020/0275492 A1* 8/2020 Lei ..................... H04L 5/0053

FOREIGN PATENT DOCUMENTS

| CN | 108737016 A | 11/2018 |
|---|---|---|
| EP | 3478019 A1 | 5/2019 |

OTHER PUBLICATIONS

ITRI, RACH resources in time domain enhancements. 3GPP TSG RAN WG1 #96bis, Xian, China, Apr. 8-12, 2019, R1-1905040, 4 pages.

3GPP TSG RAN WG1 Meeting #95, R1-1813221, Discussion on Procedures for Initial Access and Mobility in NR-U, InterDigital Inc., Spokane, USA, Nov. 12 16, 2018, total 10 pages.

3GPP TSG RAN WG1 Meeting #96bis, R1-1903929, Initial access in NR unlicensed, Huawei, HiSilicon, Xi an, China, Apr. 8 12, 2019, total 14 pages.

3GPP TSG RAN WG1 #97, R1-1906763, Initial Access and Mobility Procedures in NR-U, InterDigital, Inc., Reno, USA, May 13 17, 2019, total 4 pages.

ZTE, Sanechips, Discussion on enhancement of initial access procedures for NR-U. 3GPP TSG RAN WG1 Meeting #96bis, Xi an, China, Apr. 8-12, 2019, R1-1903874, 12 pages.

3GPP TR 38.889 V16.0.0 (Dec. 2018), 3rd Generation Partnership Project; Technical Specification Group Radio Access Network; Study on NR-based access to unlicensed spectrum(Release 16), 119 pages.

LG Electronics, Initial access and mobility for NR-U. 3GPP TSG RAN WG1 #96bis, Xi an, China, Apr. 8 12, 2019, R1-1904623, 21 pages.

LG Electronics, Physical layer design of UL signals and channels for NR unlicensed operation. 3GPP TSG RAN WG1 Meeting #94, Gothenburg, Sweden, Aug. 20 24, 2018, R1-1808506, 8 pages.

* cited by examiner

RESOURCE ALLOCATION METHOD, BASE STATION, AND TERMINAL

CROSS-REFERENCE TO RELATED APPLICATIONS

This application is a continuation of International Application No. PCT/CN2020/089233, filed on May 8, 2020, which claims priority to Chinese Patent Application No. 201910385123.4, filed on May 9, 2019. The disclosures of the aforementioned applications are hereby incorporated by reference in their entireties.

TECHNICAL FIELD

This application relates to the field of communications technologies, and in particular, to a resource allocation method, a base station, and a terminal.

BACKGROUND

Random access is a basic and important procedure in a long term evolution (Long Term Evolution, LTE for short) system and a new radio (New Radio, NR for short) system. Main objectives of the random access are to: 1. achieve uplink synchronization; and 2. allocate a unique cell radio network temporary identifier (C-RNTI for short) to a terminal, to request a network to allocate an uplink resource to the terminal. Therefore, the random access is not only used for initial access, but also may be used for new cell access in a handover process, access after a radio link failure, uplink synchronization restoration when there is uplink/downlink data transmission, an uplink shared channel (UL-SCH for short) resource request, and the like.

There are two different random access procedures: a contention-based random access procedure and a non-contention-based random access procedure. For contention-based random access, an entire procedure usually includes four operations. In the first operation, a terminal may send a preamble to a base station by using a random access channel (RACH for short) resource allocated by the base station. However, in an unlicensed frequency band, a channel contention-based access mechanism is used. Before sending the preamble by using the allocated RACH resource, the terminal needs to perform listen before talk (LBT for short), and can send the preamble only after the LBT succeeds. Therefore, if the LBT fails, the terminal cannot send the preamble, and if the LBT succeeds, because a time point at which the LBT succeeds may not match the allocated RACH resource in terms of time, the terminal cannot send the preamble, increasing a latency and uncertainty of accessing a cell by the terminal.

SUMMARY

A technical problem to be resolved in embodiments of this application is to provide a resource allocation method, a base station, and a terminal, to resolve a problem of a high random access latency of a terminal.

According to a first aspect, an embodiment of this application provides a resource allocation method. The method may include:

A base station sends a configuration message to a terminal, where the configuration message is used to configure, for the terminal, a random access channel RACH resource used in a channel occupancy time COT.

The base station receives a random access request that is sent by the terminal based on the RACH resource allocated by using the configuration message.

In an embodiment, the configuration message includes: time domain position information of the RACH resource.

In an embodiment, the configuration message is downlink control information DCI, and the time domain position information includes:

information about a relative position of the RACH resource and the DCI.

In an embodiment, the time domain position information further includes:

a quantity of times that the RACH resource appears in the COT or a repetition periodicity of the RACH resource appearing in the COT.

In an embodiment, the configuration message is a discovery reference signal DRS, and the time domain position information includes:

information about a relative position of the RACH resource and the DRS.

In an embodiment, the time domain position information further includes:

a quantity of times that the RACH resource appears and/or an interval at which the RACH resource appears, and a mapping relationship between a synchronization signal/PBCH block SSB in the DRS and the RACH resource.

In an embodiment, the configuration message includes at least one RACH configuration parameter.

Alternatively, the configuration message includes a RACH configuration index, and the RACH configuration index is used to indicate the terminal to obtain a corresponding RACH configuration parameter from a preset RACH configuration table.

In an embodiment, a frequency domain configuration of the RACH resource uses a frequency domain configuration of an allocated RACH resource that is persistent or semi-persistent in a current cell.

Alternatively, a frequency domain configuration of the RACH resource uses a frequency domain configuration of an allocated RACH resource on one or more minimum unit bandwidths that are used for LBT and on which the LBT succeeds.

Alternatively, the base station performs frequency domain configuration on the RACH resource.

According to a second aspect, an embodiment of this application provides a resource allocation method. The method may include:

A terminal receives a configuration message sent by a base station, where the configuration message is used to configure, for the terminal, a random access channel RACH resource used in a channel occupancy time COT.

The terminal sends a random access request to the base station based on the RACH resource allocated by using the configuration message.

In an embodiment, the configuration message includes: time domain position information of the RACH resource.

In an embodiment, the configuration message is downlink control information DCI, and the time domain position information includes:

information about a relative position of the RACH resource and the DCI.

In an embodiment, the time domain position information further includes:

a quantity of times that the RACH resource appears in the COT or a repetition periodicity of the RACH resource appearing in the COT.

In an embodiment, the configuration message is a discovery reference signal DRS, and the time domain position information includes:

information about a relative position of the RACH resource and the DRS.

In an embodiment, the time domain position information further includes:

a quantity of times that the RACH resource appears and/or an interval at which the RACH resource appears, and a mapping relationship between a synchronization signal/PBCH block SSB in the DRS and the RACH resource.

In an embodiment, the configuration message includes at least one RACH configuration parameter.

Alternatively, the configuration message includes a RACH configuration index, and the RACH configuration index is used to indicate the terminal to obtain a corresponding RACH configuration parameter from a preset RACH configuration table.

In an embodiment, a frequency domain configuration of the RACH resource uses a frequency domain configuration of an allocated RACH resource that is persistent or semi-persistent in a current cell.

Alternatively, a frequency domain configuration of the RACH resource uses a frequency domain configuration of an allocated RACH resource on one or more minimum unit bandwidths that are used for LBT and on which the LBT succeeds.

Alternatively, the base station performs frequency domain configuration on the RACH resource.

According to a third aspect, an embodiment of this application provides a base station. The base station may include:

a sending unit, configured to send a configuration message to a terminal, where the configuration message is used to configure, for the terminal, a random access channel RACH resource used in a channel occupancy time COT; and a receiving unit, configured to receive a random access request that is sent by the terminal based on the RACH resource allocated by using the configuration message.

In an embodiment, the configuration message includes:

time domain position information of the RACH resource.

In an embodiment, the configuration message is downlink control information DCI, and the time domain position information includes:

information about a relative position of the RACH resource and the DCI.

In an embodiment, the time domain position information further includes:

a quantity of times that the RACH resource appears in the COT or a repetition periodicity of the RACH resource appearing in the COT.

In an embodiment, the configuration message is a discovery reference signal DRS, and the time domain position information includes:

information about a relative position of the RACH resource and the DRS.

In an embodiment, the time domain position information further includes:

a quantity of times that the RACH resource appears and/or an interval at which the RACH resource appears, and a mapping relationship between a synchronization signal/PBCH block SSB in the DRS and the RACH resource.

In an embodiment, the configuration message includes at least one RACH configuration parameter.

Alternatively, the configuration message includes a RACH configuration index, and the RACH configuration index is used to indicate the terminal to obtain a corresponding RACH configuration parameter from a preset RACH configuration table.

In an embodiment, a frequency domain configuration of the RACH resource uses a frequency domain configuration of an allocated RACH resource that is persistent or semi-persistent in a current cell.

Alternatively, a frequency domain configuration of the RACH resource uses a frequency domain configuration of an allocated RACH resource on one or more minimum unit bandwidths that are used for LBT and on which the LBT succeeds.

Alternatively, the base station performs frequency domain configuration on the RACH resource.

According to a fourth aspect, an embodiment of this application provides a communications apparatus. The terminal may include:

a receiving unit, configured to receive a configuration message sent by a base station, where the configuration message is used to configure, for the terminal, a random access channel RACH resource used in a channel occupancy time COT; and a sending unit, configured to send a random access request to the base station based on the RACH resource allocated by using the configuration message.

In an embodiment, the configuration message includes:

time domain position information of the RACH resource.

In an embodiment, the configuration message is downlink control information DCI, and the time domain position information includes:

information about a relative position of the RACH resource and the DCI.

In an embodiment, the time domain position information further includes:

a quantity of times that the RACH resource appears in the COT or a repetition periodicity of the RACH resource appearing in the COT.

In an embodiment, the configuration message is a discovery reference signal DRS, and the time domain position information includes:

information about a relative position of the RACH resource and the DRS.

In an embodiment, the time domain position information further includes:

a quantity of times that the RACH resource appears and/or an interval at which the RACH resource appears, and a mapping relationship between a synchronization signal/PBCH block SSB in the DRS and the RACH resource.

In an embodiment, the configuration message includes at least one RACH configuration parameter.

Alternatively, the configuration message includes a RACH configuration index, and the RACH configuration index is used to indicate the terminal to obtain a corresponding RACH configuration parameter from a preset RACH configuration table.

In an embodiment, a frequency domain configuration of the RACH resource uses a frequency domain configuration of an allocated RACH resource that is persistent or semi-persistent in a current cell.

Alternatively, a frequency domain configuration of the RACH resource uses a frequency domain configuration of an allocated RACH resource on one or more minimum unit bandwidths that are used for LBT and on which the LBT succeeds.

Alternatively, the base station performs frequency domain configuration on the RACH resource.

According to a fifth aspect, an apparatus is provided. The apparatus provided in this application has a function of implementing behavior of the base station or the terminal in the aspects of the foregoing methods, and includes corresponding means (means) configured to perform the operations or the functions described in the aspects of the foregoing methods. The operations or the functions may be implemented by using software, hardware (for example, a circuit), or a combination of hardware and software.

In an embodiment, the apparatus includes one or more processors and a communications unit. The one or more processors are configured to support the apparatus in performing a corresponding function of the base station in the foregoing methods. For example, the processor generates a configuration message used to configure, for the terminal, a random access channel RACH resource used in a channel occupancy time COT. The communications unit is configured to support the apparatus in communicating with another device, to implement a receiving function and/or a sending function. For example, the communications unit sends the configuration message to the terminal, and receives a random access request sent by the terminal.

In an embodiment, the apparatus may further include one or more memories. The memory is configured to be coupled to the processor, and the memory stores program instructions and/or data necessary for the apparatus. The one or more memories may be integrated with the processor, or may be disposed independent of the processor. This is not limited in this application.

The apparatus may be a base station, a gNB, a TRP, or the like. The communications unit may be a transceiver or a transceiver circuit. In an embodiment, the transceiver may alternatively be an input/output circuit or an interface.

The apparatus may alternatively be a communications chip. The communications unit may be an input/output circuit or an interface of the communications chip.

In an embodiment, the apparatus includes a transceiver, a processor, and a memory. The processor is configured to control the transceiver or the input/output circuit to send and receive a signal, and the memory is configured to store a computer program. The processor is configured to run the computer program in the memory, to enable the apparatus to perform the method completed by the base station in any one of the first aspect or an embodiment of the first aspect.

In an embodiment, the apparatus includes one or more processors and a communications unit. The one or more processors are configured to support the apparatus in performing a corresponding function of the terminal in the foregoing methods. For example, the processor parses the received configuration message, and obtains configuration parameters of the RACH resource. The communications unit is configured to support the apparatus in communicating with another device, to implement a receiving function and/or a sending function. For example, the communications unit receives the configuration message sent by the base station, and sends the random access request to the base station.

In an embodiment, the apparatus may further include one or more memories. The memory is configured to be coupled to the processor, and the memory stores program instructions and/or data necessary for an apparatus. The one or more memories may be integrated with the processor, or may be disposed independent of the processor. This is not limited in this application.

The apparatus may be an intelligent terminal, a wearable device, or the like. The communications unit may be a transceiver or a transceiver circuit. In an embodiment, the transceiver may alternatively be an input/output circuit or an interface.

The apparatus may alternatively be a communications chip. The communications unit may be an input/output circuit or an interface of the communications chip.

In an embodiment, the apparatus includes a transceiver, a processor, and a memory. The processor is configured to control the transceiver or the input/output circuit to send and receive a signal, and the memory is configured to store a computer program. The processor is configured to run the computer program in the memory, to enable the apparatus to perform the method completed by the terminal in any one of the second aspect or an embodiment of the second aspect.

According to a sixth aspect, a system is provided, and the system includes the base station and the terminal.

According to a seventh aspect, a computer-readable storage medium is provided, and is configured to store a computer program. The computer program includes instructions used to perform the method according to any one of the first aspect or an embodiment of the first aspect.

According to an eighth aspect, a computer-readable storage medium is provided, and is configured to store a computer program. The computer program includes instructions used to perform the method according to any one of the second aspect or an embodiment of the second aspect.

According to a ninth aspect, a computer program product is provided. The computer program product includes computer program code. When the computer program code is run on a computer, the computer is enabled to perform the method according to any one of the first aspect or an embodiment of the first aspect.

According to a tenth aspect, a computer program product is provided. The computer program product includes computer program code. When the computer program code is run on a computer, the computer is enabled to perform the method according to any one of the second aspect or an embodiment of the second aspect.

BRIEF DESCRIPTION OF DRAWINGS

To describe the technical solutions in embodiments of this application or in the background more clearly, the following describes the accompanying drawings for describing the embodiments of this application or the background.

DESCRIPTION OF EMBODIMENTS

The following describes the embodiments of this application with reference to the accompanying drawings in the embodiments of this application.

The terms "include", "comprise", and any other variants thereof in the specification, claims, and the accompanying drawings of this application are intended to cover a non-exclusive inclusion. For example, a process, a method, a system, a product, or a device that includes a series of operations or units is not limited to the listed operations or units, but optionally further includes an unlisted operation or unit, or optionally further includes another inherent operation or unit of the process, the method, the product, or the device.

With increasing communications requirements of people, communications technologies are rapidly developing. After a cell search process, a terminal achieves downlink synchronization with a cell. Therefore the terminal can receive downlink data. However, the terminal can perform uplink transmission only after achieving uplink synchronization with the cell. The terminal establishes a connection to the cell through a random access procedure (Random Access Procedure, RAP for short) and achieves uplink synchronization with the cell. Random access may be completed between a base station and the terminal by using a msg 1 to a msg 4. The msg 1 indicates that the terminal sends a random access preamble. The msg 2 indicates that the base station sends a random access response message. The msg 3 indicates that the terminal sends the msg 3, and content of the msg 3 corresponds to several types of triggering events of the random access. For example, content of the msg 3 during initial access is a radio resource control (RRC for short) connection request, and content of the msg 3 during connection reestablishment is an RRC connection reestablishment request. The msg 4 indicates that the base station sends a conflict resolution message. Therefore, the random access procedure is completed.

When this random access method is applied to, for example, a system that works in new radio in an unlicensed spectrum (NRU for short), the NRU system works in the unlicensed spectrum, and the unlicensed spectrum needs to be shared among a plurality of devices or even between an NRU device and an inter-RAT (such as Wi-Fi) device through channel preemption. Therefore, the device needs to listen to a channel before sending a signal, and can send the signal only after determining that the channel is idle. This mechanism is referred to as listen before talk. To improve random access efficiency of the terminal, it is expected to ensure that the preamble can be successfully sent after the LBT succeeds. Therefore, a method for enabling a terminal to implement fast random access in such an unlicensed spectrum communications system needs to be provided.

For ease of description, a 5G system is used for description in the embodiments of the present disclosure. One of ordinary skilled in the art should understand that the implementations in the embodiments of the present disclosure are also applicable to an existing communications system and a future communications system at a higher level, such as a 6G communications system and a 7G communications system. This is not limited in the embodiments of the present disclosure.

The following describes in detail a random access method and a device in the embodiments of the present disclosure with reference to the accompanying drawings.

Figure 1:
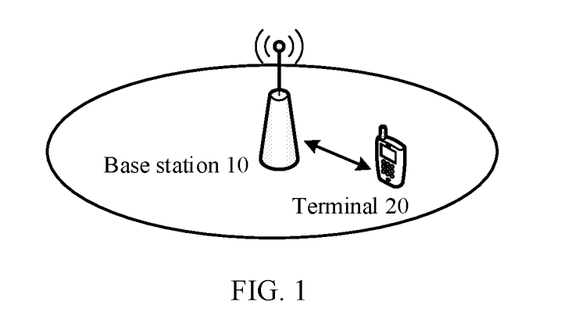
FIG. 1 is a schematic architectural diagram of a communications system according to an embodiment of this application.

FIG. 1 is a schematic architectural diagram of a communications system according to an embodiment of this application. The communications system may include a base station and at least one terminal. The terminal may also be referred to as user equipment (User Equipment, UE for short).

A base station 10 may be an NR base station (gNB), an evolved NodeB (eNB for short), a NodeB (NB for short), a base station controller (BSC for short), a base transceiver station (BTS for short), a home base station (for example, a home evolved NodeB or a home Node B, HNB for short), a baseband unit (BBU for short), and the like. The base station 10 may also be referred to as a base station transceiver, a radio base station, a radio transceiver, a transceiver function, a base station subsystem (BSS for short), or some other appropriate terms by one of ordinary skilled in the art. The base station 10 is an entity, on a network side, configured to transmit a signal or receive a signal. In an embodiment of the application, the base station 10 may send a configuration message to the terminal 20, to dynamically allocate a RACH resource to the terminal 20.

The terminal 20 may also be referred to as user equipment (UE for short). The terminal 20 may include a cellular phone, a smartphone, a session initiation protocol (SIP for short) phone, a laptop computer, a personal digital assistant (PDA for short), satellite radio, a global positioning system, a multimedia device, a video device, a digital audio player (for example, an MP3 player), a camera, a game console, or any other device with a similar function. The terminal may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handheld device, a user agent, a mobile client, a client, or some other appropriate terms by one of ordinary skilled in the art. The terminal 20 is an entity, on a user side, configured to receive a signal or transmit a signal. In an embodiment of the application, the terminal 20 may receive the configuration message sent by the base station 10, obtain a configuration parameter of the RACH resource, and send a random access request based on the RACH resource dynamically allocated by the base station 10, to implement fast random access. For ease of description, only one terminal 20 is shown in an embodiment of the application. In an actual scenario, there may be one or more terminals 20. Some of the terminals may further serve as transit devices, and may send downlink information to some other terminals, and a user group may be formed by the terminals. This is not limited in an embodiment of the application.

Figure 2:
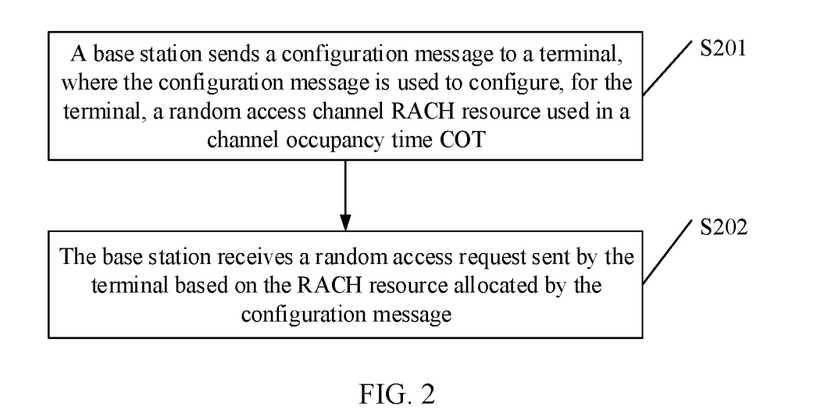
FIG. 2 is a schematic flowchart of a resource allocation method according to an embodiment of this application.

FIG. 2 is a schematic flowchart of a resource allocation method according to an embodiment of this application. The following operations are included.

S201: A base station sends a configuration message to a terminal.

The configuration message is used to configure, for the terminal, a random access channel (RACH) resource used in a channel occupancy time (COT for short).

When the base station/terminal performs LBT on a channel (for example, 20 MHz), if the LBT succeeds, the base station/terminal obtains permission to use the channel in a period of time. The period of time may be referred to as the channel occupancy time (COT). Maximum COT duration after channel preemption is related to a priority used for performing the LBT, and the priority may include CAT 2, CAT 4, and the like. For example, when CAT 2 LBT is used for performing channel access, the maximum COT duration is 4 ms. When CAT 4 LBT is used for performing channel access, the maximum COT duration is 8 ms or 10 ms. After the LBT succeeds, the base station may send the configuration message. In this case, the COT is established and countdown is performed.

When the base station/terminal performs LBT on a plurality of channels, LBT on one or more sub-channels (for example, 20 MHz) may succeed. A method for performing the LBT is similar to that in the foregoing case of one channel, and details are not described herein again. The base station/terminal may perform transmission on a set of the foregoing sub-channels on which the LBT succeeds, and a COT start time and end time are the same on the sub-channels.

In an embodiment, the configuration message includes: time domain position information of the RACH resource.

In an embodiment, the configuration message is downlink control information (Downlink control information, DCI for short), and the time domain position information includes:

information about a relative position of the RACH resource and the DCI.

After the LBT succeeds and a COT length is obtained, the time domain position information of the RACH resource may be carried in the DCI, and the terminal is notified of the time domain position information.

S202: The base station receives a random access request that is sent by the terminal based on the RACH resource allocated by using the configuration message.

In an embodiment, when generating the configuration message, the base station may perform configuration based on a configuration table partially the same as an NR RACH resource configuration table (for example, some parameters in some configuration items are different). That is, a sequence number of one configuration item is carried in the configuration message and used to indicate a plurality of corresponding configuration parameters, and a relative position relationship between the RACH resource and the DCI is carried in one or more parameters of the configuration item. This implementation may be compatible with an existing NR RACH resource configuration mechanism, thereby reducing hardware and software modification costs.

It should be noted that in an embodiment of the application, the RACH resource may also be referred to as a PRACH resource.

For example, Table 1 below is a part of the NR RACH resource configuration table. Meanings of parameters are as follows:

parameters. When the UE prestores a RACH configuration table, the UE may query the table by using the random access configuration sequence number, to obtain a RACH resource configuration parameter.

2. The preamble format indicates a preamble sequence format. Currently, an NR system supports a long sequence format (including 0/1/2/3) with a sequence length of 839 and a short sequence format (including A1/A2/A3/B1/B2/B3/B4) with a length of 139.

3. For x and y, x is a RACH resource configuration periodicity. For example, 16 indicates that a RACH resource appears every 160 ms. y=1 indicates that the RACH resource appears in system frames 1, 17, and 33.

4. The subframe number indicates a subframe index, and is used to indicate a subframe (ranging from 0 to 9) in which the RACH resource is located.

5. The starting symbol is used to indicate a symbol (ranging from 0 to 13) that is in a subframe and in which the RACH resource is located.

6. The number of PRACH slots within a subframe is used to indicate a quantity of physical random access channel (PRACH for short) slots (slots) included in one subframe.

7. The number of time-domain PRACH occasions within a PRACH slot is used to indicate a quantity of PRACH occasions included in one PRACH slot, where the PRACH occasion represents a time-frequency resource used for random access.

TABLE 1

| PRACH configuration index | Preamble format | $n_{SFN}$ mod x = y | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 9 | 0 | — | — | 0 |
| 1 | 0 | 8 | 1 | 9 | 0 | — | — | 0 |
| 2 | 0 | 4 | 1 | 9 | 0 | — | — | 0 |
| 3 | 0 | 2 | 0 | 9 | 0 | — | — | 0 |
| 4 | 0 | 2 | 1 | 9 | 0 | — | — | 0 |
| 5 | 0 | 2 | 0 | 4 | 0 | — | — | 0 |
| 6 | 0 | 2 | 1 | 4 | 0 | — | — | 0 |
| 7 | 0 | 1 | 0 | 9 | 0 | — | — | 0 |
| 8 | 0 | 1 | 0 | 8 | 0 | — | — | 0 |
| 9 | 0 | 1 | 0 | 7 | 0 | — | — | 0 |
| 10 | 0 | 1 | 0 | 6 | 0 | — | — | 0 |
| 11 | 0 | 1 | 0 | 5 | 0 | — | — | 0 |
| 12 | 0 | 1 | 0 | 4 | 0 | — | — | 0 |
| 13 | 0 | 1 | 0 | 3 | 0 | — | — | 0 |
| 14 | 0 | 1 | 0 | 2 | 0 | — | — | 0 |
| 15 | 0 | 1 | 0 | 1, 6 | 0 | — | — | 0 |
| 16 | 0 | 1 | 0 | 1, 6 | 7 | — | — | 0 |
| 17 | 0 | 1 | 0 | 4, 9 | 0 | — | — | 0 |
| 18 | 0 | 1 | 0 | 3, 8 | 0 | — | — | 0 |
| 19 | 0 | 1 | 0 | 2, 7 | 0 | — | — | 0 |
| 20 | 0 | 1 | 0 | 8, 9 | 0 | — | — | 0 |
| 21 | 0 | 1 | 0 | 4, 8, 9 | 0 | — | — | 0 |
| 22 | 0 | 1 | 0 | 3, 4, 9 | 0 | — | — | 0 |
| 23 | 0 | 1 | 0 | 7, 8, 9 | 0 | — | — | 0 |
| 24 | 0 | 1 | 0 | 3, 4, 8, 9 | 0 | — | — | 0 |
| 25 | 0 | 1 | 0 | 6, 7, 8, 9 | 0 | — | — | 0 |
| 26 | 0 | 1 | 0 | 1, 4, 6, 9 | 0 | — | — | 0 |
| 27 | 0 | 1 | 0 | 1, 3, 5, 7, 9 | 0 | — | — | 0 |

1. The PRACH configuration index indicates a random access configuration sequence number that may be used as a RACH resource configuration index, and is used to notify UE of a set of current system RACH resource configuration 8. The PRACH duration is used to indicate a quantity of symbols that each RACH resource lasts in time domain.

When the method described in an embodiment is applied to an NRU system, because a radius of an NRU cell is relatively small, a configuration table 2 of the NRU system may not include the configuration items (about the first 120 items) that are based on the preamble format 0/1/2/3 (mainly for a large-radius cell) and in the foregoing NR configuration table 1, but include a PRACH configuration item that is triggered by the DCI and based on the short sequence format (A1/A2/A3/B1/B2/B3/B4). One configuration item includes an entire row of data in the table. In addition, in the configuration table 2 of the NRU system, different configuration items may be used to indicate a relative position relationship between a dynamically allocated RACH resource and DCI. The configuration table 2 of the NRU system and parameter configuration of the PRACH configuration item have the following meanings.

not include the configuration item corresponding to the preamble format 0/1/2/3, but includes the configuration item corresponding to the short sequence format A1/A2/A3/B1/B2/B3/B4 with the length of 139.

3. For $x_1$ and $y_1$, $x_1$ may be used to indicate a relative position relationship between DCI that triggers dynamic RACH resource allocation and a dynamically allocated RACH resource, namely, a time offset value. In an embodiment, the relative position relationship may be indicated by using a subframe or a system frame as a unit or a granularity. For example, the RACH resource is offset by two subframes or three system frames relative to a time domain resource of the DCI. In this way, the terminal may determine, based on a value of $x_1$, a time domain position at which the dynami-

TABLE 2

| PRACH configuration index | Preamble format | $n_{SFN} \bmod x_1 = y_1$ | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | $x_1$ | $y_1$ | | | | | |
| 0 | A1 | 0 | 1 | 0 | 0 | — | — | 0 |
| 1 | A2 | 1 | 2 | 1, 3, 5, 7 | 0 | — | — | 0 |
| 2 | A3 | 2 | 3 | 2, 5, 8 | 0 | — | — | 0 |
| 3 | A4 | 3 | 4 | 3, 7 | 0 | — | — | 0 |
| 4 | B2 | 4 | 5 | 4 | 0 | — | — | 0 |
| 5 | B3 | 5 | 6 | 5 | 0 | — | — | 0 |
| 6 | B4 | 6 | Reserved information | 6 | 0 | — | — | 0 |

1. The PRACH configuration index indicates a random access configuration sequence number that may be used as a RACH resource configuration index, and is used to notify UE of a set of current system RACH resource configuration parameters. When the UE prestores a RACH configuration table, the UE may query the table by using the random access configuration sequence number, to obtain a RACH resource configuration parameter. Compared with Table 1, herein, a configuration item corresponding to the preamble format 0/1/2/3 is not included.

The random access configuration sequence number in Table 2 may use the sequence number in Table 1, or may be renumbered. This is not limited herein. There are many methods for continuing to use the sequence numbers in Table 1. For example, Table 1 and Table 2 are substantially combined into one large table, and the configuration items in Table 2 are supplemented after the configuration items in Table 1. For another example, Table 2 is a virtual table, namely, a part of indication functions that are actually nested in Table 1. Content such as parameters and possible values of the parameters in the configuration items in Table 1 remain unchanged, and some of the configuration items may be used in the NRU system. However, indication functions of one or more parameters in some configuration items used in the NRU system are different from those of the one or more parameters in some configuration items used in an NR system. In other words, for ease of application, Table 1 and Table 2 may be properly simplified, for example, a configuration item corresponding to the short sequence format A1/A2/A3/B1/B2/B3/B4 with the length of 139 is reused in the NR system and the NRU system. A storage capacity of the simplified tables can be further reduced.

2. The preamble format indicates a preamble sequence format. The configuration table 2 of the NRU system does cally allocated RACH resource first appears. In the COT, the dynamically allocated RACH resource is used to send a preamble to perform random access. In an embodiment, the time domain position information further includes a quantity of times that the RACH resource appears in the COT or a repetition periodicity of the RACH resource appearing in the COT. In this case, $y_1$ may be used to indicate a quantity of times that the dynamically allocated RACH resource appears in the COT or a repetition periodicity of the dynamically allocated RACH resource appearing in the COT. In this way, the terminal may determine, based on values of $x_1$ and $y_1$ and the COT length, a time domain position at which the dynamically allocated RACH resource first appears. For example, a common COT length is 8 ms. If $y_1=2$, when $x_1$ is equal to 0, the dynamically allocated RACH resource appears in the first subframe and the third subframe in the COT. If $y_1=3$ and $x_1=1$, the dynamically allocated RACH resource appears in the second subframe, the fifth subframe, and the eighth subframe in the COT. Alternatively, $y_1$ may be set as reserved information (For example, reserved bits).

4. The subframe number indicates a subframe number, and is used to indicate a subframe (ranging from 0 to 9) in which the dynamically allocated RACH resource is located.

5. The starting symbol is used to indicate a symbol (ranging from 0 to 13) that is in a subframe and in which the dynamically allocated RACH resource is located.

6. The number of PRACH slots within a subframe is used to indicate a quantity of PRACH slots included in one subframe.

7. The number of time-domain PRACH occasions within a PRACH slot is used to indicate a quantity of PRACH occasions included in one PRACH slot, where the PRACH occasion represents a dynamically allocated time-frequency resource used for random access.

8. The PRACH duration is used to indicate a quantity of symbols that each dynamically allocated RACH resource lasts in time domain.

It should be noted that, for ease of description, Table 2 provides only an example of a possible configuration item of the short sequence format (A1/A2/A3/B1/B2/B3/B4). During actual use, a plurality of configuration items may be obtained based on various combinations of configuration parameters, and details are not described herein.

In an embodiment, a RACH resource dynamically allocated by the base station by using the DCI may be valid in a current COT, or may be valid in one or several subsequent COTs. A valid time may be agreed upon in advance in a standard protocol, or may be indicated in DCI. This is not limited in an embodiment of the application.

In an embodiment, in addition to reusing the NR PRACH configuration table to perform PRACH configuration in the NRU system, a new preset PRACH configuration table may also be generated for allocation of the RACH resource in the NRU system. A configuration parameter is included in the new PRACH configuration table.

In an embodiment, the configuration message may include at least one RACH configuration parameter of the eight items in the foregoing configuration table 2.

Alternatively, the configuration message includes a RACH configuration index that is similar to that is the foregoing random access configuration sequence number. The RACH configuration index is used to indicate the terminal to obtain a corresponding RACH configuration parameter from a preset RACH configuration table.

After receiving the configuration message, the terminal may obtain, by using the configuration message, a configuration parameter that is of the RACH resource dynamically allocated in the current COT or several subsequent COTs and that is indicated by the base station.

It can be learned from the configuration items included in Table 2 that, if all configuration parameters are indicated in Table 2, a quantity of the configuration items of the RACH resources obtained through dynamic allocation triggered by the DCI may reach 120. Therefore, in the DCI, 7 bits are required to indicate a currently used RACH configuration parameter. This results in relatively high indication overheads.

In an embodiment, the base station may notify the UE of a currently available RACH resource configuration item of the cell by using one or more of common information, such as remaining minimum system information (RMSI for short), other system information (OSI for short), a group common physical downlink control channel (GC-PDCCH for short), and radio resource control (RRC) signaling. After learning of some available RACH resource configuration items, the UE may remove an unavailable configuration item from the RACH resource configuration table, thereby reducing a quantity of bits that are used to indicate the RACH configuration item and that is in the DCI, and reducing DCI overheads. For example, it is assumed that there are 128 configuration items for dynamic allocation of the RACH resource, and there may be only 16 configuration items for use by a current cell. Therefore, the terminal may be notified of the 16 available items by using the foregoing information or signaling. In this way, a quantity of bits can be reduced when the base station sends the DCI. For example, when there are 16 available configuration items, only 4 bits are required for indication, thereby reducing the DCI overheads. Certainly, the complete RACH resource configuration table may alternatively be retained, and the base station performs selection and indication only from the available configuration items.

In an embodiment, the base station may further periodically or aperiodically update or resend, by using the RMSI, the OSI, the GC-PDCCH, and the RRC, a currently available RACH resource configuration item of the cell, including a change of a quantity of configuration items and/or a change of a sequence number of a configuration item. For example, a quantity of last available configuration items ranges from 1 to 16, and a quantity of currently available configuration items ranges from 2 to 17. The DCI overheads can be reduced by indicating the available configuration item, so that efficiency of obtaining a RACH resource configuration parameter through parsing by the terminal is improved, thereby improving an access probability of the UE and reducing an access latency of the UE.

In an embodiment, in addition to notifying, by using the foregoing configuration message, the terminal of the time domain position information of the dynamically allocated RACH resource, a frequency domain position of the RACH resource may be configured in any one of the following manners.

In an embodiment, a frequency domain configuration of the RACH resource may use a frequency domain configuration of an allocated RACH resource that is persistent or semi-persistent in a current cell.

Alternatively, a frequency domain configuration of the RACH resource may use a frequency domain configuration of an allocated RACH resource on one or more minimum unit bandwidths that are used for LBT and on which the LBT succeeds.

Alternatively, the base station performs frequency domain configuration on the RACH resource.

The minimum unit bandwidth used for the LBT is 20 MHz, and 20 MHz is a unit bandwidth of one Wi-Fi standard channel and is also a unit bandwidth (nominal channel bandwidth, NCB for short) of the NRU system. In other words, the terminal detects, on each 20 MHz bandwidth, total energy on the channel. When energy exceeds a threshold, the terminal considers that the 20 MHz channel is occupied by another device and does not perform transmission. Otherwise, when the energy is lower than a threshold, the terminal considers that the 20 MHz channel is idle and performs data transmission. In conclusion, 20 MHz is the minimum unit bandwidth for performing LBT, and a device may simultaneously perform LBT on a plurality of 20 MHz channels. Transmission may be performed on 20 MHz channels on which the LBT succeeds.

In an embodiment, the frequency domain configuration may remain unchanged in one or more COTs.

In addition, it should be noted that, in an existing NRU system, a discovery reference signal (DRS for short) subcarrier spacing is 15/30 kHz, and a PRACH subcarrier spacing is 15/30/60 kHz. Therefore, the time offset value x in item 3 in the dynamic RACH configuration table 2 of the NRU system may be indicated by using one of the DRS subcarrier spacings, or by using one of the PRACH subcarrier spacings, where x may be understood as a quantity, and the subcarrier spacing may be understood as a unit. A subcarrier spacing, used by the time offset value x, indicated in item 3 may be agreed upon in advance in a standard protocol, or may be indicated by the base station in a manner such as the RMSI, the OSI, the GC-PDCCH, and the RRC. This is not limited in an embodiment of the application.

In an embodiment, the configuration message may be a discovery reference signal (DRS), and the time domain position information may include:

information about a relative position of the RACH resource and the DRS.

In an embodiment, the dynamically allocated RACH resource may be adjacent to the DRS (adjacent to DRS) in time domain, and the base station may indicate, in a physical broadcast channel (PBCH for short)/RMSI/OSI in the DRS, a time offset between the RACH resource and the last DRS unit. Being adjacent means that when the base station sends only one DRS, the first symbol of a dynamic RACH resource corresponding to the DRS is adjacent to the last symbol of the DRS or separated by one symbol from the last symbol of the DRS, and is used for the UE to perform uplink LBT. When the base station sends a group of DRSs in which there are more than one DRSs, the last symbol of the last DRS is adjacent to the first symbol of the first RACH resource in a RACH resource group or separated by one symbol from the first symbol of the first RACH resource in a RACH resource group, and is used for the UE to perform uplink LBT.

In an embodiment, the time domain position information may further include:

a quantity of times that the RACH resource appears and/or an interval at which the RACH resource appears, and a mapping relationship between a synchronization signal/PBCH block (SSB for short) in the DRS and the RACH resource.

A beam direction used by the base station to send the SSB is consistent with a beam direction of receiving a preamble by the base station on a corresponding RACH resource. Alternatively, a quasi-colocation (QCL for short) relationship exists between a beam direction used by the base station to send the SSB and a beam direction of receiving a preamble by the base station on a corresponding RACH resource. Therefore, there is a correspondence between the SSB and the RACH resource. Because the SSB occupies only one slot in time domain, but may correspond to a plurality of RACH resources in frequency domain, the mapping relationship between the SSB and the RACH resource may be indicated.

For example, one SSB corresponds to one/two/four/eight RACH resources, or one/two/four/eight SSBs correspond to one RACH resource.

In addition, because one RACH resource usually occupies only a 2 MHz bandwidth, a plurality of RACH resources may exist in frequency domain. Therefore, a repetition quantity (1/2/4/8) of the RACH resource in frequency domain on the minimum unit bandwidth in which the DRS is located, namely, a 20 MHz channel, may be further indicated.

In an embodiment, if the DRS is received on a 20 MHz channel 1, the device may send data on the channel 1. In this case, a RACH resource configuration message of the channel 1 needs to be configured. If the DRS is also received on a 20 MHz channel 2, a RACH resource configuration message of the channel 2 may be further configured.

Similar to the configuration performed by using the DCI, the dynamically allocated RACH resource is adjacent to the DRS in time domain, and the foregoing configuration parameters are fixed or have only limited values. Therefore, the configuration parameter of the RACH resource adjacent to the DRS may be agreed upon in a standard protocol, or configured by the base station in the PBCH/RMSI/OSI/RRC. When the UE is notified, and each time the base station sends the DRS, one or more bits are carried in a PBCH/RMSI/RMSI of the SSB to indicate a currently used RACH resource configuration parameter. In other words, the base station may send the RACH resource to the terminal by configuring at least one of the foregoing optional parameters in the DRS, by using a configuration index, or by using a configuration parameter or a configuration index carried in one or more bits, so that the terminal obtains the configuration parameter by querying a table.

In an embodiment, when the base station configures only a part of the configuration parameters of the dynamically allocated RACH resource in the PBCH/RMSI/OSI of the DRS, indication information of the remaining configuration parameters may use configuration information of a persistent/semi-persistent RACH resource configured in a system.

For a frequency domain configuration manner, refer to the descriptions of the DCI as the configuration message. Details are not described herein again.

S202: The base station receives a random access request that is sent by the terminal based on the RACH resource allocated by using the configuration message.

After receiving the configuration message sent by the base station, the terminal may obtain the RACH resource allocated by the base station to the terminal, then send a preamble based on the allocated RACH resource, and initiate the random access request to the base station. Then, the terminal exchanges information of a msg 2 to a msg 4 with the base station to implement random access.

In an embodiment of the application, the base station sends the configuration message to the terminal, to allocate, to the terminal, the RACH resource used in the COT, so that after the LBT, the terminal has the available RACH resource to send the preamble. Therefore, fast access of the terminal during contention-based access in an unlicensed spectrum is ensured, an access latency of the terminal is reduced, a success rate and access efficiency of random access of the terminal are improved, and efficiency and stability of an entire system are also improved. The DCI or the DRS is used as the configuration message or used to carry the configuration message, to be better compatible to an existing system, reduce reconstruction costs. This is easy to implement.

Figure 3:
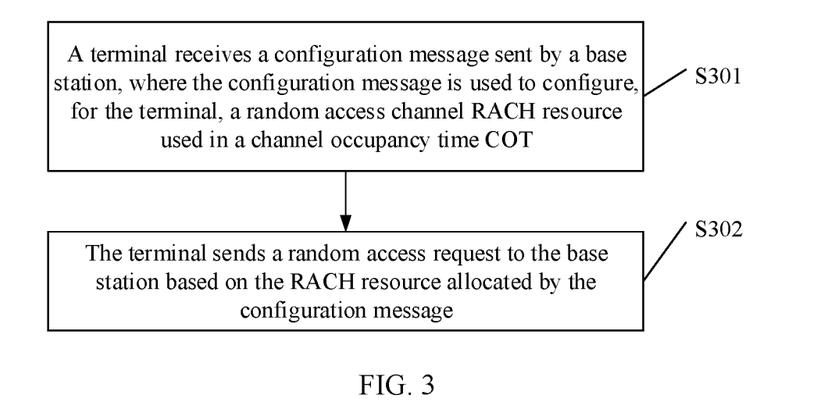
FIG. 3 is a schematic flowchart of another resource allocation method according to an embodiment of this application.

FIG. 3 is a schematic flowchart of another resource allocation method according to an embodiment of this application. The method includes the following operations.

S301: A terminal receives a configuration message sent by a base station.

The configuration message is used to configure, for the terminal, a random access channel RACH resource used in a channel occupancy time COT.

The terminal may parse the configuration message, and obtain, from the configuration message, the RACH resource allocated by the base station to the terminal.

S302: The terminal sends a random access request to the base station based on the RACH resource allocated by using the configuration message.

This embodiment basically describes the device in the embodiment shown in FIG. 2. For concepts, explanations, detailed descriptions that are related to the technical solutions provided in an embodiment of the application, refer to the descriptions of the content in the method described in FIG. 2. Details are not described herein.

Figure 4:
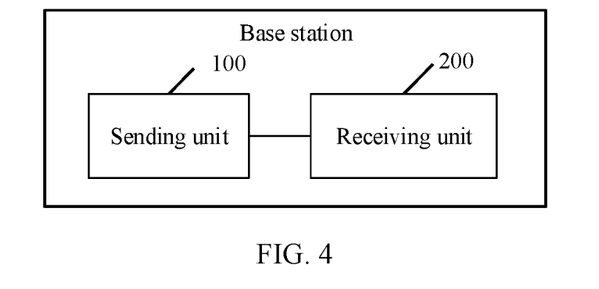
FIG. 4 is a schematic composition diagram of a base station according to an embodiment of this application.

FIG. 4 is a schematic composition diagram of a base station according to an embodiment of this application. The base station may include:

a sending unit 100, configured to send a configuration message to a terminal, where the configuration message is used to configure, for the terminal, a random access channel RACH resource used in a channel occupancy time COT; and a receiving unit 200, configured to receive a random access request that is sent by the terminal based on the RACH resource allocated by using the configuration message.

In an embodiment, the configuration message includes: time domain position information of the RACH resource.

In an embodiment, the configuration message is downlink control information DCI, and the time domain position information includes:

information about a relative position of the RACH resource and the DCI.

In an embodiment, the time domain position information further includes:

a quantity of times that the RACH resource appears in the COT or a repetition periodicity of the RACH resource appearing in the COT.

In an embodiment, the configuration message is a discovery reference signal DRS, and the time domain position information includes:

information about a relative position of the RACH resource and the DRS.

In an embodiment, the time domain position information further includes:

a quantity of times that the RACH resource appears and/or an interval at which the RACH resource appears, and a mapping relationship between a synchronization signal/PBCH block SSB in the DRS and the RACH resource.

In an embodiment, the configuration message includes at least one RACH configuration parameter.

Alternatively, the configuration message includes a RACH configuration index, and the RACH configuration index is used to indicate the terminal to obtain a corresponding RACH configuration parameter from a preset RACH configuration table.

In an embodiment, a frequency domain configuration of the RACH resource uses a frequency domain configuration of an allocated RACH resource that is persistent or semi-persistent in a current cell.

Alternatively, a frequency domain configuration of the RACH resource uses a frequency domain configuration of an allocated RACH resource on one or more minimum unit bandwidths that are used for LBT and on which the LBT succeeds.

Alternatively, the base station performs frequency domain configuration on the RACH resource.

For concepts, explanations, detailed descriptions, and other operations of the base station that are related to the technical solutions provided in an embodiment of the application, refer to the descriptions of the content in the foregoing methods or other embodiments. Details are not described herein.

Figure 5:
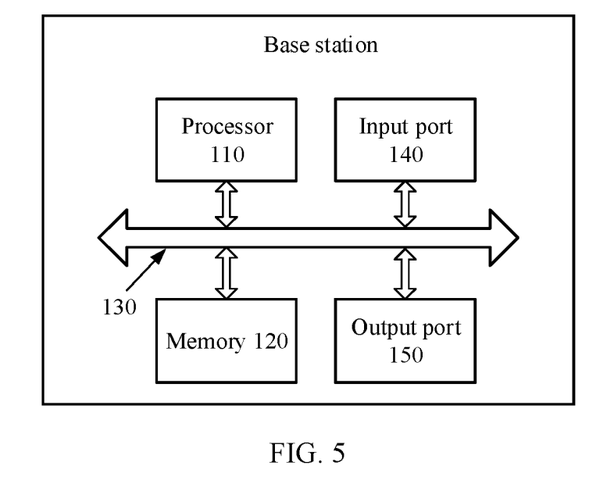
FIG. 5 is a schematic composition diagram of another base station according to an embodiment of this application.

FIG. 5 is a schematic composition diagram of another base station according to an embodiment of this application. As shown in FIG. 5, the base station may include a processor 110, a memory 120, and a bus 130. The processor 110 and the memory 120 are connected through the bus 130. The memory 120 is configured to store instructions. The processor 110 is configured to execute the instructions stored in the memory 120, to implement the operations in the method corresponding to FIG. 2.

Further, the base station may further include an input port 140 and an output port 150. The processor 110, the memory 120, the input port 140, and the output port 150 may be connected through the bus 130.

The processor 110 is configured to execute the instructions stored in the memory 120, to control the input port 140 to receive a signal, and control the output port 150 to send a signal, to complete the operations performed by the base station in the foregoing methods. The input port 140 and the output port 150 may be a same physical entity or different physical entities. When the input port 140 and the output port 150 are the same physical entity, the input port 140 and the output port 150 may be collectively referred to as an input/output port. The memory 120 may be integrated into the processor 110, or may be disposed separately from the processor 110.

In an embodiment, it may be considered that functions of the input port 140 and the output port 150 are implemented by using a transceiver circuit or a dedicated transceiver chip. It may be considered that the processor 110 is implemented by using a dedicated processing chip, a processing circuit, a processor, or a general-purpose chip.

In an embodiment, it may be considered that the base station provided in an embodiment of the application is implemented by using a general-purpose computer. For example, program code that is used to implement functions of the processor 110, the input port 140, and the output port 150 is stored in the memory, and a general-purpose processor implements the functions of the processor 110, the input port 140, and the output port 150 by executing the code in the memory.

For concepts, explanations, detailed descriptions, and other operations of the base station that are related to the technical solutions provided in an embodiment of the application, refer to the descriptions of the content in the foregoing methods or other embodiments. Details are not described herein.

Figure 6:
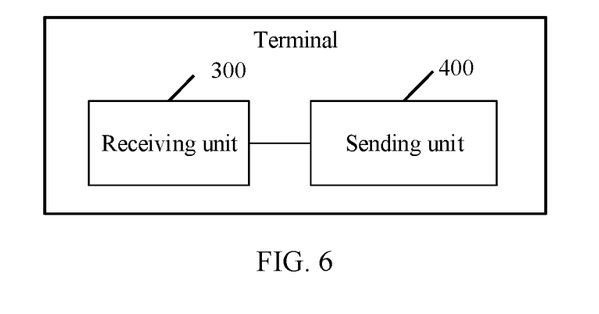
FIG. 6 is a schematic composition diagram of a terminal according to an embodiment of this application.

FIG. 6 is a schematic composition diagram of a terminal according to an embodiment of this application. The terminal may include:

a receiving unit 300, configured to receive a configuration message sent by a base station, where the configuration message is used to configure, for the terminal, a random access channel RACH resource used in a channel occupancy time COT; and a sending unit 400, configured to send a random access request to the base station based on the RACH resource allocated by using the configuration message.

In an embodiment, the configuration message includes: time domain position information of the RACH resource.

In an embodiment, the configuration message is downlink control information DCI, and the time domain position information includes:

information about a relative position of the RACH resource and the DCI.

In an embodiment, the time domain position information further includes:

a quantity of times that the RACH resource appears in the COT or a repetition periodicity of the RACH resource appearing in the COT.

In an embodiment, the configuration message is a discovery reference signal DRS, and the time domain position information includes:

information about a relative position of the RACH resource and the DRS.

In an embodiment, the time domain position information further includes:

a quantity of times that the RACH resource appears and/or an interval at which the RACH resource appears, and a mapping relationship between a synchronization signal/PBCH block SSB in the DRS and the RACH resource.

In an embodiment, the configuration message includes at least one RACH configuration parameter.

Alternatively, the configuration message includes a RACH configuration index, and the RACH configuration index is used to indicate the terminal to obtain a corresponding RACH configuration parameter from a preset RACH configuration table.

In an embodiment, a frequency domain configuration of the RACH resource uses a frequency domain configuration of an allocated RACH resource that is persistent or semi-persistent in a current cell.

Alternatively, a frequency domain configuration of the RACH resource uses a frequency domain configuration of an allocated RACH resource on one or more minimum unit bandwidths that are used for LBT and on which the LBT succeeds.

Alternatively, the base station performs frequency domain configuration on the RACH resource.

For concepts, explanations, detailed descriptions, and other operations of the terminal that are related to the technical solutions provided in an embodiment of the application, refer to the descriptions of the content in the foregoing methods or other embodiments. Details are not described herein.

Figure 7:
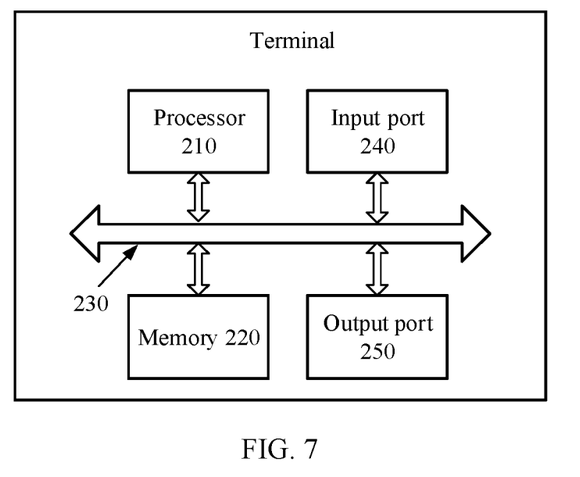
FIG. 7 is a schematic composition diagram of another terminal according to an embodiment of this application.

FIG. 7 is a schematic composition diagram of another terminal according to an embodiment of this application. As shown in FIG. 7, the terminal may include a processor 210, a memory 220, and a bus 230. The processor 210 and the memory 220 are connected through the bus 230. The memory 220 is configured to store instructions. The processor 210 is configured to execute the instructions stored in the memory 220, to implement the operations performed by the terminal in the method corresponding to FIG. 3.

Further, the terminal may further include an input port 240 and an output port 250. The processor 210, the memory 220, the input port 240, and the output port 250 may be connected through the bus 230.

The processor 210 is configured to execute the instructions stored in the memory 220, to control the input port 240 to receive a signal, and control the output port 250 to send a signal, to complete the operations performed by the terminal in the foregoing methods. The input port 240 and the output port 250 may be a same physical entity or different physical entities. When the input port 240 and the output port 250 are the same physical entity, the input port 240 and the output port 250 may be collectively referred to as an input/output port. The memory 220 may be integrated into the processor 210, or may be disposed separately from the processor 210.

In an embodiment, it may be considered that functions of the input port 240 and the output port 250 are implemented by using a transceiver circuit or a dedicated transceiver chip. It may be considered that the processor 210 is implemented by using a dedicated processing chip, a processing circuit, a processor, or a general-purpose chip.

In an embodiment, it may be considered that the terminal provided in an embodiment of the application is implemented by using a general-purpose computer. For example, program code that is used to implement functions of the processor 210, the input port 240, and the output port 250 is stored in the memory, and a general-purpose processor implements the functions of the processor 210, the input port 240, and the output port 250 by executing the code in the memory.

For concepts, explanations, detailed descriptions, and other operations of the terminal that are related to the technical solutions provided in an embodiment of the application, refer to the descriptions of the content in the foregoing methods or other embodiments. Details are not described herein.

One of ordinary skilled in the art may understand that, for ease of description, FIG. 5 and FIG. 7 show only one memory and only one processor. In an actual controller, there may be a plurality of processors and memories. The memory may also be referred to as a storage medium, a storage device, or the like. This is not limited in an embodiment of the application.

It should be understood that the processor in an embodiment of the application may be a central processing unit (CPU for short), or may be another general-purpose processor, a digital signal processor (DSP for short), an application-specific integrated circuit (ASIC for short), a field programmable gate array (FPGA for short) or another programmable logic device, a discrete gate or a transistor logic device, a discrete hardware component, or the like.

The memory may include a read-only memory and a random access memory, and provide instructions and data to the processor. A part of the memory may further include a non-volatile random access memory.

In addition to a data bus, the bus may further include a power bus, a control bus, a status signal bus, and the like. However, for clear description, various types of buses in the figure are marked as the bus.

In an implementation process, operations in the foregoing methods may be implemented by using an integrated logical circuit of hardware in the processor, or by using instructions in a form of software. The operations of the method disclosed with reference to the embodiments of this application may be directly performed by a hardware processor, or may be performed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor. To avoid repetition, details are not described herein again.

According to the methods provided in the embodiments of this application, an embodiment of this application further provides a system, including the foregoing base station and terminal.

Sequence numbers of the foregoing processes do not mean execution sequences in various embodiments of this application. The execution sequences of the processes should be determined based on functions and internal logic of the processes, and should not be constructed as any limitation on the implementation processes of the embodiments of this application.

One of ordinary skill in the art may be aware that various illustrative logical blocks (illustrative logical blocks, ILBs for short) and operations that are described with reference to the embodiments disclosed in this specification can be implemented by electronic hardware or a combination of computer software and electronic hardware. Whether the functions are performed by hardware or software depends on particular applications and design constraints of the technical solutions. One of ordinary skill in the art may use different methods to implement the described functions for each particular application, but it should not be considered that the implementation goes beyond the scope of this application.

In the several embodiments provided in this application, it should be understood that, the disclosed system, apparatus, and method may be implemented in another manner. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

The foregoing descriptions are merely implementations of this application, but are not intended to limit the protection scope of this application. Any variation or replacement readily figured out by one of ordinary skilled in the art within the technical scope disclosed in this application shall fall within the protection scope of this application. Therefore, the protection scope of this application shall be subject to the protection scope of the claims.

What is claimed is:

1. A communications apparatus for resource allocation, comprising:
   a transceiver,
   a processor, and
   a memory, wherein the processor is configured to control the transceiver to:
   send a configuration message to a terminal, wherein the configuration message is used to configure, for the terminal, a random access channel (RACH) resource used in a channel occupancy time (COT) and the configuration message comprises time domain position information of the RACH resource and a discovery reference signal (DRS), the time domain position information comprising:
   a quantity of times that the RACH resource appears and/or an interval at which the RACH resource appears, and
   a mapping relationship between a synchronization signal/PBCH block (SSB) in the DRS and the RACH resource; and
   receive a random access request sent by the terminal based on the RACH resource allocated by using the configuration message.

2. The communications apparatus according to claim 1, wherein the configuration message comprises downlink control information (DCI), and wherein the time domain position information comprises:
   information about a relative position of the RACH resource and the DCI.

3. The communications apparatus according to claim 2, wherein the time domain position information further comprises:
   a quantity of times that the RACH resource appears in the COT or a repetition periodicity of the RACH resource appearing in the COT.

4. The communications apparatus according to claim 1, wherein the time domain position information comprises:
   information about a relative position of the RACH resource and the DRS.

5. A communications apparatus, comprising:
   a transceiver,
   a processor, and
   a memory, wherein the processor is configured to control the transceiver to:
   receive a configuration message sent by a base station, wherein the configuration message is used to configure, for a terminal, a random access channel (RACH) resource used in a channel occupancy time (COT) and the configuration message comprises time domain position information of the RACH resource, wherein the time domain position information comprises a quantity of times that the RACH resource appears in the COT or a repetition periodicity of the RACH resource appearing in the COT; and
   send a random access request to the base station based on the RACH resource allocated by using the configuration message.

6. The communications apparatus according to claim 5, wherein the configuration message is comprises downlink control information (DCI), and wherein the time domain position information comprises:
   information about a relative position of the RACH resource and the DCI.

7. The communications apparatus according to claim 5, wherein the configuration message comprises a discovery reference signal (DRS), and wherein the time domain position information comprises:
   information about a relative position of the RACH resource and the DRS.

8. The communications apparatus according to claim 7, wherein the time domain position information further comprises:
   a quantity of times that the RACH resource appears and/or an interval at which the RACH resource appears, and
   a mapping relationship between a synchronization signal/PBCH block (SSB) in the DRS and the RACH resource.

9. A resource allocation method, comprising:
   receiving, by a terminal, a configuration message sent by a base station, wherein the configuration message is used to configure, for the terminal, a random access channel (RACH) resource used in a channel occupancy time (COT) and the configuration message includes time domain position information of the RACH resource, the time domain position information including a quantity of times that the RACH resource appears in the COT or a repetition periodicity of the RACH resource appearing in the COT; and sending, by the terminal, a random access request to the base station based on the RACH resource allocated by using the configuration message.

10. The method according to claim 9, wherein the configuration message comprises downlink control information DCI, and wherein the time domain position information comprises:

information about a relative position of the RACH resource and the DCI.

11. The method according to claim 9, wherein the configuration message comprises a discovery reference signal (DRS), and wherein the time domain position information comprises:

information about a relative position of the RACH resource and the DRS.

12. The method according to claim 11, wherein the time domain position information further comprises:

a quantity of times that the RACH resource appears and/or an interval at which the RACH resource appears, and a mapping relationship between a synchronization signal/PBCH block SSB in the DRS and the RACH resource.

* * * * *